(12) United States Patent
Kim et al.

(10) Patent No.: US 10,728,070 B2
(45) Date of Patent: Jul. 28, 2020

(54) METHOD FOR TRANSMITTING OR RECEIVING SIGNAL IN WIRELESS LAN SYSTEM AND DEVICE THEREFOR

(71) Applicant: LG ELECTRONICS INC., Seoul (KR)

(72) Inventors: Jinmin Kim, Seoul (KR); Hangyu Cho, Seoul (KR); Sungjin Park, Seoul (KR); Kyungtae Jo, Seoul (KR)

(*) Notice: Subject to any disclaimer, the term of this patent is extended or adjusted under 35 U.S.C. 154(b) by 0 days.

(21) Appl. No.: 16/332,778

(22) PCT Filed: Sep. 12, 2017

(86) PCT No.: PCT/KR2017/009988
§ 371 (c)(1),
(2) Date: Mar. 12, 2019

(87) PCT Pub. No.: WO2018/048284
PCT Pub. Date: Mar. 15, 2018

(65) Prior Publication Data
US 2019/0215205 A1  Jul. 11, 2019

Related U.S. Application Data

(60) Provisional application No. 62/393,440, filed on Sep. 12, 2016, provisional application No. 62/412,285, filed on Oct. 25, 2016.

(51) Int. Cl.
*H04L 27/26* (2006.01)
*H04L 1/00* (2006.01)
*H04W 84/12* (2009.01)

(52) U.S. Cl.
CPC ......... *H04L 27/2602* (2013.01); *H04L 1/00* (2013.01); *H04L 1/0011* (2013.01); *H04L 1/0029* (2013.01); *H04W 84/12* (2013.01)

(58) Field of Classification Search
None
See application file for complete search history.

(56) References Cited

U.S. PATENT DOCUMENTS

2008/0086662 A1* 4/2008 Li ................. H04L 1/0003
714/704
2012/0218982 A1 8/2012 Lee et al.
(Continued)

FOREIGN PATENT DOCUMENTS

KR   20110022524 A * 3/2011 ........... H04L 1/0003
KR   1020110022524    3/2011
(Continued)

OTHER PUBLICATIONS

PCT International Application No. PCT/KR2017/009988, International Search Report dated Jan. 9, 2018, 6 pages.
(Continued)

*Primary Examiner* — Xavier S Wong
(74) *Attorney, Agent, or Firm* — Lee Hong Degerman Kang Waimey

(57) ABSTRACT

The present specification relates to a method for transmitting or receiving a signal by a station in a wireless LAN (WLAN) system and, more particularly, provides a method in which when a station transmits or receives a signal through a plurality of spatial streams in a wireless LAN system, the station operates a modulation and coding scheme (MCS) applied to each spatial stream, a method for transmitting or receiving a signal on the basis of the same, and a device therefor.

11 Claims, 12 Drawing Sheets

(56) References Cited

U.S. PATENT DOCUMENTS

| | | | |
|---|---|---|---|
| 2016/0204915 A1* | 7/2016 | Chen | H04L 1/0061 |
| | | | 370/329 |
| 2017/0265224 A1* | 9/2017 | Sanderovich | H04B 7/0413 |
| 2018/0020374 A1* | 1/2018 | Kasher | H04L 1/0003 |
| 2018/0026749 A1* | 1/2018 | Lomayev | H04L 1/0643 |
| | | | 375/267 |
| 2018/0069669 A1* | 3/2018 | Park | H04B 7/0695 |
| 2018/0302925 A1* | 10/2018 | Wikstrom | H04L 1/00 |

FOREIGN PATENT DOCUMENTS

| | | | | |
|---|---|---|---|---|
| KR | 20110081946 A | * | 7/2011 | H04B 7/0678 |
| KR | 1020110081946 | | 7/2011 | |
| KR | 20120011899 A | * | 2/2012 | H04B 7/0669 |
| WO | 2016024750 | | 2/2016 | |

OTHER PUBLICATIONS

Cariou, L. et al., "Preliminary design of EDMG PHY headers", doc.: IEEE 802.11-16/1046r0, Jul. 2016, 8 pages.

European Patent Office Application Serial No. 17849168.4, Search Report dated Sep. 30, 2019, 7 pages.

Lomayev, et al., "EDMG Header-B Encoding and Modulation for SC PHY in 11ay", IEE 802.11-16/0989r0, Jul. 25, 2016, 13 pages.

Intel Corporation, "Comparision between Single and Multiple Codewords for Precoded MIMO", R1-061127, 3GPP TSG RAN WG1 #45, May 2006, 7 pages.

\* cited by examiner

FIG. 9

| CH 1 | L-STF | L-CE | L-Header | ay Header A | ay STF | ay CE | ay Header B | ay payload |
|---|---|---|---|---|---|---|---|---|
|  | GF-STF | GF-CE |  |  |  |  |  |  |
| CH 2 | L-STF | L-CE | L-Header | ay Header A |  |  |  |  |

(L: Legacy, GF: Gap Filling, ay: 802.11ay)

METHOD FOR TRANSMITTING OR RECEIVING SIGNAL IN WIRELESS LAN SYSTEM AND DEVICE THEREFOR

CROSS-REFERENCE TO RELATED APPLICATIONS

This application is the National Stage filing under 35 U.S.C. 371 of International Application No. PCT/KR2017/009988, filed on Sep. 12, 2017, which claims the benefit of U.S. Provisional Application No. 62/393,440, filed on Sep. 12, 2016, and 62/412,285, filed on Oct. 25, 2016, the contents of which are all hereby incorporated by reference herein in their entirety.

BACKGROUND OF THE INVENTION

Field of the Invention

The present specification relates to a method for transmitting or receiving a signal by a station in a wireless LAN (WLAN) system and, more particularly, to a method in which, when a station transmits or receives a signal based on a plurality of spatial streams in a wireless LAN system, the station indicates a modulation and coding scheme (MCS) applied to each spatial stream, a method for transmitting or receiving a signal on the basis of the same, and a device therefor.

Related Art

WLAN Standards have been developed as Institute of Electrical and Electronics Engineers (IEEE) 802.11. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for eight spatial streams and IEEE 802.11ax standards are under discussion.

Meanwhile, IEEE 802.11ad defines performance enhancement for high-speed throughput in the 60 GHz band, and IEEE 802.11ay, for introducing channel bonding and MIMO technology to IEEE 802.11ad systems for the first time, is being discussed.

SUMMARY OF THE INVENTION

A station may transmit or receive a signal through up to eight spatial streams in a 11ay system to which the present invention is applicable. In this case, the signal transmitting station may indicate MCSs for the up to eight spatial streams with minimum signaling overhead.

The present invention proposes a method in which, when a station transmits or receives a signal through up to eight spatial streams, the station indicates an MCS for each spatial stream, and a method for transmitting or receiving a signal on the basis of the same.

In an aspect of the present invention, there is provided a method in which a first station (STA) transmits a signal to a second STA based on a plurality of spatial streams in a wireless LAN (WLAN) system, the method comprising: determining, by the first STA, Modulation and Coding Scheme (MCS) information for up to eight spatial streams, wherein the MCS information includes information related to a reference MCS, a plurality of MCSs for different spatial streams having a same code rate as the reference MCS, and modulation order differential information of the reference MCS; and transmitting a signal containing the determined MCS information to the second STA based on/through the up to eight spatial streams.

In another aspect of the present invention, there is provided a method in which a first station (STA) receives a signal from a second STA based on a plurality of spatial streams in a wireless LAN (WLAN) system, the method comprising: receiving a signal containing Modulation and Coding Scheme (MCS) information for up to eight spatial streams, wherein the MCS information includes information related to a reference MCS, a plurality of MCSs for different spatial streams having a same code rate as the reference MCS, and modulation order differential information of the reference MCS, from the second STA based on/through the up to eight spatial streams; and decoding the signal received through the up to eight spatial streams by using the MCS information for up to eight spatial streams.

In yet another aspect of the present invention, there is provided a station device for transmitting a signal based on a plurality of spatial streams in a wireless LAN (WLAN) system, the station device comprising: a transceiver having one or more RF (radio frequency) chains and configured to transmit or receive a signal to or from another station device; and a processor connected to the transceiver and processing the signal transmitted or received to or from the another station device, wherein the processor is configured to determine Modulation and Coding Scheme (MCS) information for up to eight spatial streams, wherein the MCS information includes information related to a reference MCS, a plurality of MCSs for different spatial streams having a same code rate as the reference MCS, and modulation order differential information of the reference MCS, and to transmit a signal containing the determined MCS information to a second station device based on/through the up to eight spatial streams.

In a further aspect of the present invention, there is provided a station device for receiving a signal based on a plurality of spatial streams in a wireless LAN (WLAN) system, the station device comprising: a transceiver having one or more RF (radio frequency) chains and configured to transmit or receive a signal to or from another station device; and a processor connected to the transceiver and processing the signal transmitted or received to or from the another station device, wherein the processor is configured to determine Modulation and Coding Scheme (MCS) information for up to eight spatial streams, wherein the MCS information includes information related to a reference MCS, a plurality of MCSs for different spatial streams having the same code rate as the reference MCS, and modulation order differential information of the reference MCS, to receive a signal containing the determined MCS information from a second station device based on/through the up to eight spatial streams, and to decode the signal received through the up to eight spatial streams by using the MCS information for up to eight spatial streams.

The reference MCS may be an MCS having the lowest MCS index among the MCSs for up to eight spatial streams.

Information on the reference MCS and the MCS information for up to eight spatial streams may be contained and transmitted in an EDMG (enhanced directional multi-gigabit) Header-A field in the signal.

The reference MCS may be indicated by a 5-bit length field, and the MCSs for different spatial streams and the modulation order differential information of the reference MCS may be indicated by a 2-bit length field.

The MCSs for different spatial streams and the modulation order differential information of the reference MCS may indicate that the MCS for each spatial stream is one of the following: the same MCS as the reference MCS, an MCS having the same code rate as the reference MCS and a higher modulation order than the reference MCS by 1, an MCS having the same code rate as the reference MCS and a higher modulation order than the reference MCS by 2, and an MCS having the same code rate as the reference MCS and a higher modulation order than the reference MCS by 3.

More specifically, modulation order differential information having a value of 0 may indicate that the MCS for each spatial stream is the same MCS as the reference MCS, modulation order differential information having a value of 1 may indicate that the MCS for each spatial stream is an MCS having the same code rate as the reference MCS and a higher modulation order than the reference MCS by 1, modulation order differential information having a value of 2 may indicate that the MCS for each spatial stream is an MCS having the same code rate as the reference MCS and a higher modulation order than the reference MCS by 2, and modulation order differential information having a value of 3 may indicate that the MCS for each spatial stream is an MCS having the same code rate as the reference MCS and a higher modulation order than the reference MCS by 3.

Through the above configuration, a station according to the present invention may indicate MCSs for different spatial streams with small signaling overhead and transmit or receive a signal on the basis of the MCS.

Technical problems to be solved by the present invention are not limited to the above-mentioned technical problems, and other technical problems not mentioned herein may be clearly understood by those skilled in the art from description below.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 9 is a diagram illustrating a PPDU structure applicable to the present invention.

DESCRIPTION OF EXEMPLARY EMBODIMENTS

Reference will now be made in detail to the preferred embodiments of the present invention with reference to the accompanying drawings. The detailed description, which will be given below with reference to the accompanying drawings, is intended to explain exemplary embodiments of the present invention, rather than to show only one embodiment that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or shown in block diagram form, focusing on important features of the structures and devices, so as not to obscure the concept of the present invention.

Although there may exist various mobile communication systems to which the present invention is applicable, a wireless LAN system will be described below in details as an example of a mobile communication system.

1. Wireless LAN (WLAN) System 1-1. Generals of Wireless LAN System

Figure 1:
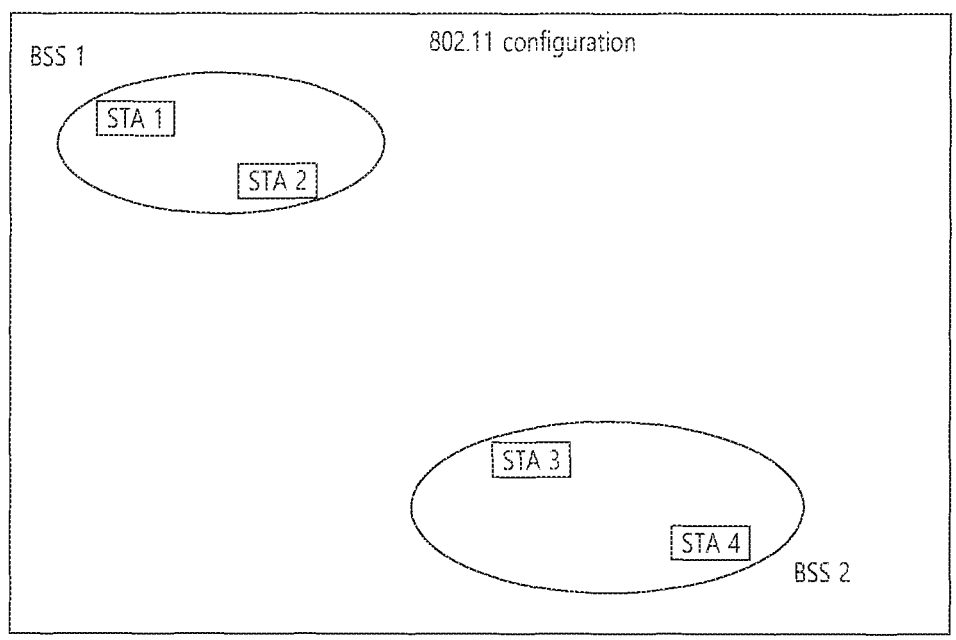
FIG. 1 is a diagram illustrating an exemplary configuration of a wireless LAN system.

FIG. 1 is a diagram illustrating an exemplary configuration of a wireless LAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), a PCP/AP (personal basic service set central point/access point), or a site controller.

The BSS may be divided into an infrastructure BSS and an Independent BSS (IBSS).

The BSSs illustrated in FIG. 1 are IBSSs. An IBSS refers to a BSS that does not include an AP. Since the IBSS does not include the AP, the IBSS is not allowed to access to the DS and thus forms a self-contained network.

Figure 2:
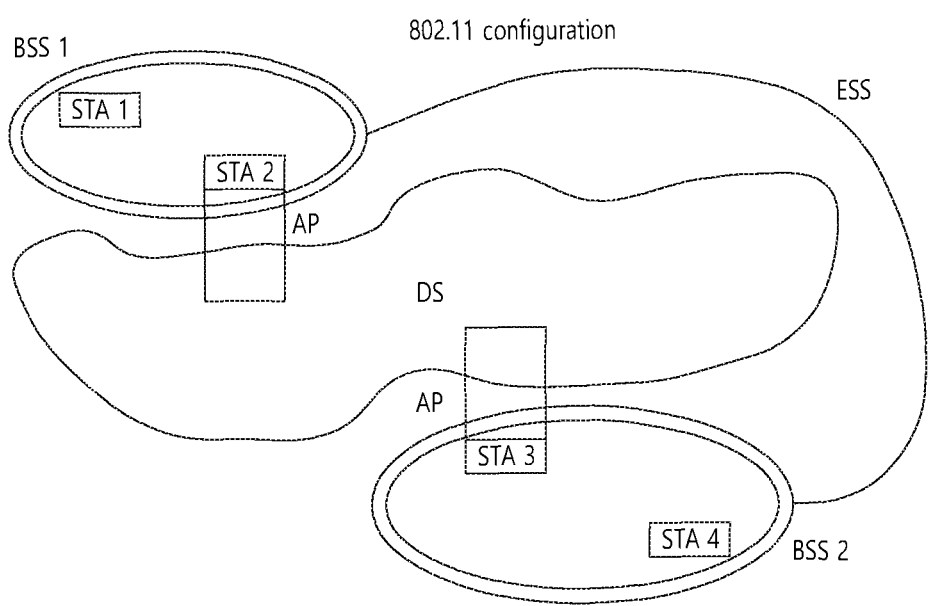
FIG. 2 is a diagram illustrating another exemplary configuration of a WLAN system.

FIG. 2 is a diagram illustrating another exemplary configuration of a WLAN system.

The BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above, a method of channel bonding in the WLAN system will be described.

1-2. Channel Bonding in WLAN System

Figure 3:
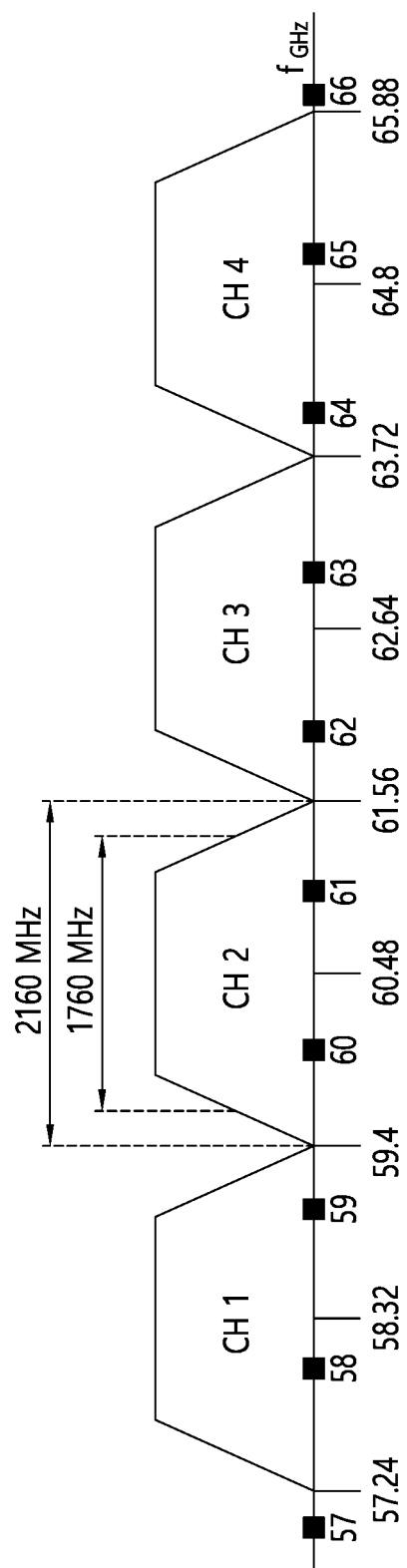
FIG. 3 is a diagram illustrating a channel in a 60 GHz band for explaining a channel bonding operation according to an embodiment of the present invention.

FIG. 3 is a diagram illustrating a channel in a 60 GHz band for explaining a channel bonding operation according to an embodiment of the present invention.

As shown in FIG. 3, four channels may be configured in the 60 GHz band, and the typical channel bandwidth may be 2.16 GHz. The ISM band (57 GHz to 66 GHz) available at 60 GHz may be specified differently for different countries. In general, channel 2 of the channels shown in FIG. 3 is available in all regions and may be used as a default channel. Most of the regions, except Australia, may use channels 2 and 3, which may be utilized for channel bonding. However, the channels used for channel bonding may vary, and the present invention is not limited to a specific channel.

Figure 4:
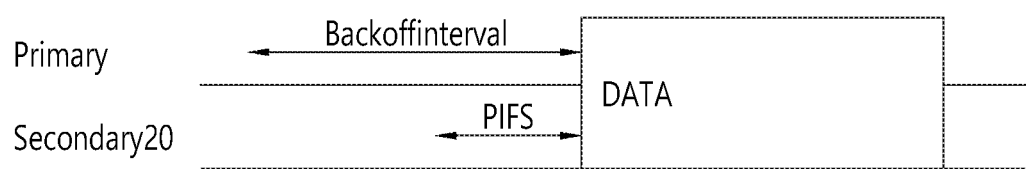
FIG. 4 illustrates a basic method of performing channel bonding in a WLAN system.

FIG. 4 illustrates a basic method of performing channel bonding in a WLAN system.

The example of FIG. 4 illustrates the operation of 40 MHz channel bonding performed by combining two 20 MHz channels in the IEEE 802.11n system. For IEEE 802.11ac, 40/80/160 MHz channel bonding may be performed.

The two channels exemplarily shown in FIG. 4 include a primary channel and a secondary channel, and the STA may review the channel status of the primary channel of the two channels in the CSMA/CA manner. If the secondary channel is idle for a predetermined time (e.g., PIFS) while the primary channel is idle during a certain backoff interval and the backoff count becomes 0, the STA may transmit data by bonding the primary channel and the secondary channel.

In the case where channel bonding is performed based on contention as shown in FIG. 4, channel bonding is allowed only when the secondary channel remains idle for a predetermined time at the time when the backoff count for the primary channel expires, and therefore the application of channel bonding is very limited, and it is difficult to flexibly cope with the media situation.

Accordingly, in one aspect of the present invention, an AP may transmit scheduling information to STAs to perform access based on scheduling. Meanwhile, in another aspect of the present invention, channel access may be performed based on the above-described scheduling or on contention independently of the above-described scheduling. In yet another aspect of the present invention, communication may be performed based on beamforming using a spatial sharing technique.

1-3. Beacon Interval Configuration

Figure 5:
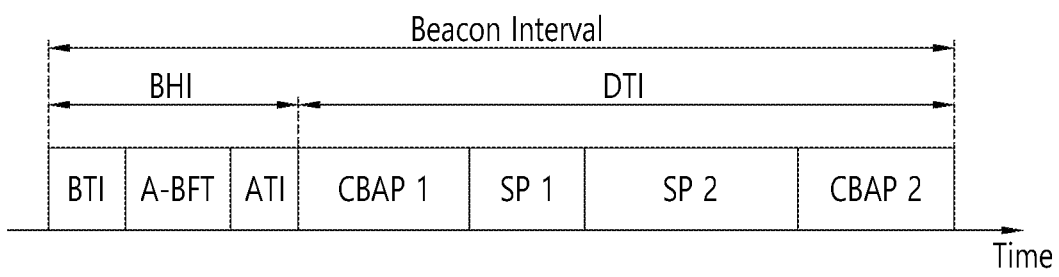
FIG. 5 is a diagram illustrating a configuration of a beacon interval.

FIG. 5 is a diagram illustrating a configuration of a beacon interval.

In 11ad-based DMG BSS systems, the media time may be divided into beacon intervals. The sub-intervals within a beacon interval may be referred to as access periods. Different access intervals within one beacon interval may have different access rules. The information on the access intervals may be transmitted to a non-AP STA or a non-PCP by the AP or Personal Basic Service Set Control Point (PCP).

As shown in FIG. 5, one beacon interval may include one beacon header interval (BHI) and one data transfer interval (DTI). The BHI may include a beacon transmission interval (BTI), an association beamforming training (A-BFT) interval, and an announcement transmission interval (ATI) as shown in FIG. 5.

The BTI refers to an interval during which one or more DMG beacon frames may be transmitted. The A-BFT interval refers to an interval during which beamforming training is performed by an STA that has transmitted the DMG beacon frame during the preceding BTI. The ATI refers to a request-response-based management access interval between a PCP/AP and a non-PCP/non-AP STA.

Meanwhile, the data transfer interval (DTI) is an interval during which frame exchange is performed between STAs, and may be allocated one or more Contention Based Access Periods (CBAPs) and one or more service periods (SPs) as shown in FIG. 5. Although FIG. 5 illustrates an example of allocation of two CBAPs and two SPs, this is illustrative and not restrictive.

Hereinafter, the physical layer configuration in a WLAN system to which the present invention is applied will be described in detail.

1-4. Physical Layer Configuration

It is assumed that the following three different modulation modes may be provided in the WLAN system according to an embodiment of the present invention.

TABLE 1

| PHY | MCS | Note |
|---|---|---|
| Control PHY | 0 | |
| Single carrier PHY (SC PHY) | 1 ... 12 | (low power SC PHY) |
| | 25 ... 31 | |
| OFDM PHY | 13 ... 24 | |

Such modulation modes may be used to satisfy different requirements (e.g., high throughput or stability). Depending on the system, only some of these modes may be supported.

Figure 6:
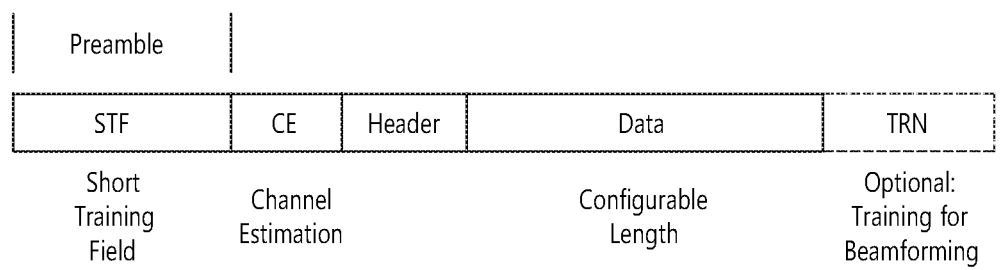
FIG. 6 is a diagram illustrating a physical configuration of an existing radio frame.

FIG. 6 is a diagram illustrating a physical configuration of an existing radio frame.

It is assumed that all the Directional Multi-Gigabit (DMG) physical layers include fields as shown in FIG. 6 in common. However, depending on the respective modes, physical layers may have a different method of defining individual fields and use a different modulation/coding scheme.

As shown in FIG. 6, the preamble of a radio frame may include a Short Training Field (STF) and Channel Estimation (CE). In addition, the radio frame may include a header and a data field as payload, and selectively include a TRN (Training) field for beamforming.

Figure 7:
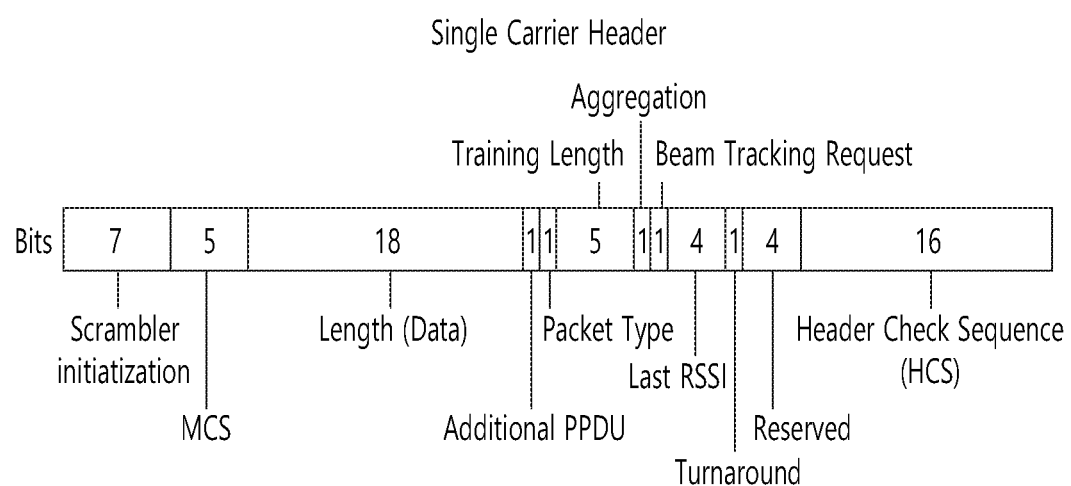
FIGS. 7 and 8 are diagrams illustrating a configuration of the header field of the radio frame of FIG. 6.
Figure 8:
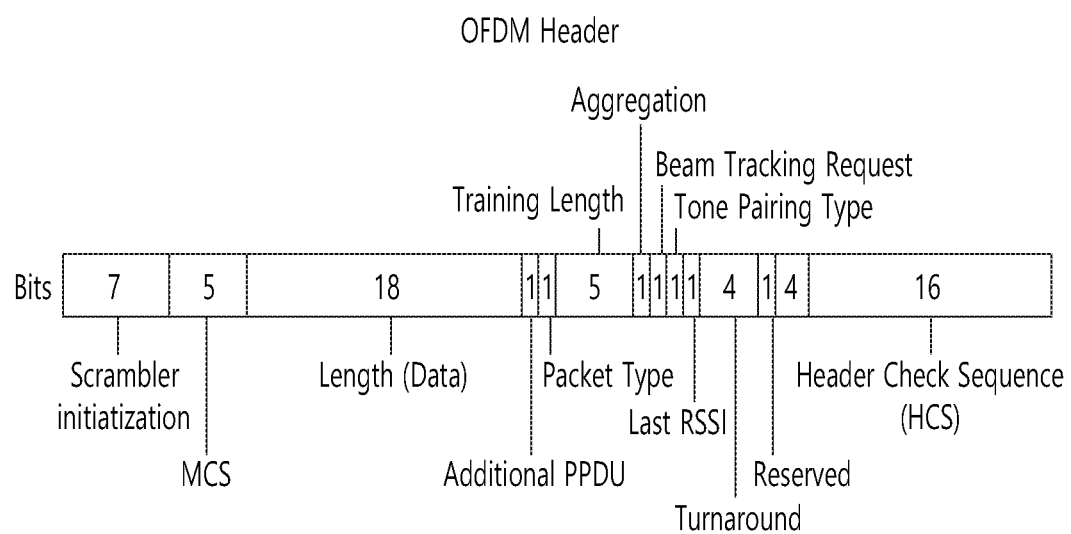

FIGS. 7 and 8 are diagrams illustrating a configuration of the header field of the radio frame of FIG. 6.

Specifically, FIG. 7 illustrates a case where a Single Carrier (SC) mode is used. In the SC mode, the header may include information indicating an initial value of scrambling, a Modulation and Coding Scheme (MCS), information indicating the length of data, information indicating the presence or absence of an additional Physical Protocol Data Unit (PPDU), a packet type, a training length, an aggregation status, a beam tracking request status, a last Received Signal Strength Indicator (RSSI), a truncation status, and a Header Check Sequence (HCS). In addition, as shown in FIG. 7, the header has 4 reserved bits. The reserved bits may be utilized in the following description.

FIG. 8 specifically illustrates a detailed configuration of a header in a case where the OFDM mode is applied. The OFDM header may include information indicating an initial value of scrambling, an MCS, information indicating the length of data, information indicating the presence or absence of additional PPDU, a packet type, a training length, an aggregation status, a beam tracking request status, a last RSSI, a truncation status, and an HCS. In addition, as shown in FIG. 8, the header has 2 reserved bits. The reserved bits may be utilized in the following description as in the case of FIG. 7.

As described above, the IEEE 802.11ay system is considering introduction of channel bonding and MIMO technology in the legacy 11ad system for the first time. In order to implement channel bonding and MIMO in 11ay, a new PPDU structure is needed. In other words, the existing 11ad PPDU structure has limitations in supporting legacy UEs and implementing channel bonding and MIMO.

For this, a legacy preamble for supporting a legacy UE and a new field for a 11ay UE following a legacy header field may be defined, and channel bonding and MIMO may be supported through the newly defined field.

FIG. 9 is a diagram illustrating a PPDU structure applicable to the present invention. In FIG. 9, the abscissa may correspond to the time domain, and the ordinate may correspond to the frequency domain.

When two or more channels are bonded, a frequency band (for example, a 400 MHz band) may exist between frequency bands (e.g., 1.83 GHz) used in the respective channels. In the mixed mode, a legacy preamble (legacy STF, legacy CE) is transmitted in duplicate through each channel. In an embodiment of the present invention, the new STF and CE fields (gap filling) may be transmitted through the 400 MHz band between the channels, along with the legacy preamble.

In this case, as shown in FIG. 9, in the PPDU structure according to the present invention, ay STF, ay CE, ay header B, and payload are transmitted over broadband after a legacy preamble, a legacy header and an ay header A. Therefore, the ay header, ay Payload field, and the like to be transmitted after the header field may be transmitted through channels used for bonding. In order to distinguish the ay header from the legacy header, the ay header may be referred to as an enhanced directional multi-gigabit (EDMG) header, or the "ay header" and the "EDMG header" may be interchangeably used.

For example, a total of six or eight channels (2.16 GHz) may be present in 11ay, and up to four channels may be bonded and transmitted to a single STA. Thus, the ay header and the ay payload may be transmitted over bandwidths of 2.16 GHz, 4.32 GHz, 6.48 GHz, and 8.64 GHz.

Alternatively, the PPDU format used when the legacy preamble is repeatedly transmitted without performing the gap-filling described above may also be considered.

In this case, the gap-filling is not performed, and thus the ay STF, ay CE, and ay header B are transmitted in a wideband after the legacy preamble, legacy header, and ay header A, without the GF-STF and GF-CE field indicated by the dotted line in FIG. 9.

Figure 10:
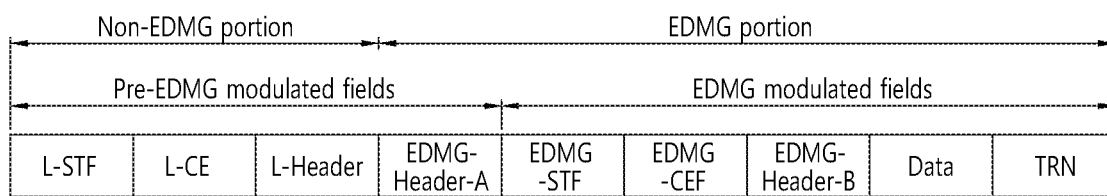
FIG. 10 is a diagram briefly illustrating a PPDU structure applicable to the present invention.

FIG. 10 is a diagram briefly illustrating a PPDU structure applicable to the present invention. The aforementioned PPDU format can be summarized as FIG. 10.

As shown in FIG. 10, a PPDU format applicable to 11ay system can include L-STF, L-CE, L-Header, EDMG-Header-A, EDMG-STF, EDMG-CEF, EDMG-Header-B, Data, and TRN fields. The above fields can be selectively included according to the form (e.g., SU PPDU, MU PPDU, etc.) of a PPDU.

In this case, a portion including the L-STF, the L-CE, and the L-header fields can be referred to as a non-EDMG portion, and the remaining portion can be referred to as an EDMG portion. And, the L-STF, the L-CE, the L-Header, and the EDMG-Header-A fields can be referred to as pre-EDMG modulated fields, and the remaining portion can be referred to as an EDMG modulated field.

2. Proposed Embodiment

In a 11ay system to which the present invention is applicable, different MCSs may be configured for an SC (single carrier mode) mode and an OFDM (Orthogonal Frequency Division Multiplexing) mode, as shown in the table below. Table 2 shows an MCS configuration for the SC mode, and Table 3 shows an MCS configuration for the OFDM mode.

TABLE 2

| EDMG-MCS | | | | | Data rate (Mbps) | | |
|---|---|---|---|---|---|---|---|
| index | Modulation | $N_{CBPS}$ | Repetition | Code Rate | Normal GI | Short GI | Long GI |
| 1 | π/2-BPSK | 1 | 2 | 1/2 | $N_{CB} \times N_{SS} \times 385.00$ | $N_{CB} \times N_{SS} \times 412.50$ | $N_{CB} \times N_{SS} \times 330.00$ |
| 2 | π/2-BPSK | 1 | 1 | 1/2 | $N_{CB} \times N_{SS} \times 770.00$ | $N_{CB} \times N_{SS} \times 825.00$ | $N_{CB} \times N_{SS} \times 660.00$ |
| 3 | π/2-BPSK | 1 | 1 | 5/8 | $N_{CB} \times N_{SS} \times 962.50$ | $N_{CB} \times N_{SS} \times 1031.25$ | $N_{CB} \times N_{SS} \times 825.00$ |
| 4 | π/2-BPSK | 1 | 1 | 3/4 | $N_{CB} \times N_{SS} \times 1155.00$ | $N_{CB} \times N_{SS} \times 1237.50$ | $N_{CB} \times N_{SS} \times 990.00$ |
| 5 | π/2-BPSK | 1 | 1 | 13/16 | $N_{CB} \times N_{SS} \times 1251.25$ | $N_{CB} \times N_{SS} \times 1340.63$ | $N_{CB} \times N_{SS} \times 1072.50$ |
| 6 | π/2-BPSK | 1 | 1 | 7/8 | $N_{CB} \times N_{SS} \times 1347.50$ | $N_{CB} \times N_{SS} \times 1443.75$ | $N_{CB} \times N_{SS} \times 1155.00$ |
| 7 | π/2-QPSK | 2 | 1 | 1/2 | $N_{CB} \times N_{SS} \times 1540.00$ | $N_{CB} \times N_{SS} \times 1650.00$ | $N_{CB} \times N_{SS} \times 1320.00$ |
| 8 | π/2-QPSK | 2 | 1 | 5/8 | $N_{CB} \times N_{SS} \times 1925.00$ | $N_{CB} \times N_{SS} \times 2062.50$ | $N_{CB} \times N_{SS} \times 1650.00$ |
| 9 | π/2-QPSK | 2 | 1 | 3/4 | $N_{CB} \times N_{SS} \times 2310.00$ | $N_{CB} \times N_{SS} \times 2475.00$ | $N_{CB} \times N_{SS} \times 1980.00$ |
| 10 | π/2-QPSK | 2 | 1 | 13/16 | $N_{CB} \times N_{SS} \times 2502.50$ | $N_{CB} \times N_{SS} \times 2681.25$ | $N_{CB} \times N_{SS} \times 2145.00$ |
| 11 | π/2-QPSK | 2 | 1 | 7/8 | $N_{CB} \times N_{SS} \times 2695.00$ | $N_{CB} \times N_{SS} \times 2887.50$ | $N_{CB} \times N_{SS} \times 2310.00$ |
| 12 | π/2-16QAM | 4 | 1 | 1/2 | $N_{CB} \times N_{SS} \times 3080.00$ | $N_{CB} \times N_{SS} \times 3300.00$ | $N_{CB} \times N_{SS} \times 2640.00$ |
| 13 | π/2-16QAM | 4 | 1 | 5/8 | $N_{CB} \times N_{SS} \times 3850.00$ | $N_{CB} \times N_{SS} \times 4125.00$ | $N_{CB} \times N_{SS} \times 3300.00$ |
| 14 | π/2-16QAM | 4 | 1 | 3/4 | $N_{CB} \times N_{SS} \times 4620.00$ | $N_{CB} \times N_{SS} \times 4950.00$ | $N_{CB} \times N_{SS} \times 3960.00$ |
| 15 | π/2-16QAM | 4 | 1 | 13/16 | $N_{CB} \times N_{SS} \times 5005.00$ | $N_{CB} \times N_{SS} \times 5362.50$ | $N_{CB} \times N_{SS} \times 4290.00$ |
| 16 | π/2-16QAM | 4 | 1 | 7/8 | $N_{CB} \times N_{SS} \times 5390.00$ | $N_{CB} \times N_{SS} \times 5775.00$ | $N_{CB} \times N_{SS} \times 4620.00$ |
| 17 | π/2-64QAM | 6 | 1 | 5/8 | $N_{CB} \times N_{SS} \times 5775.00$ | $N_{CB} \times N_{SS} \times 6187.50$ | $N_{CB} \times N_{SS} \times 4950.00$ |
| 18 | π/2-64QAM | 6 | 1 | 3/4 | $N_{CB} \times N_{SS} \times 6930.00$ | $N_{CB} \times N_{SS} \times 7425.00$ | $N_{CB} \times N_{SS} \times 5940.00$ |

TABLE 2-continued

| EDMG-MCS index | Modulation | $N_{CBPS}$ | Repetition | Code Rate | Data rate (Mbps) | | |
|---|---|---|---|---|---|---|---|
| | | | | | Normal GI | Short GI | Long GI |
| 19 | π/2-64QAM | 6 | 1 | 13/16 | $N_{CB} \times N_{SS} \times 7507.50$ | $N_{CB} \times N_{SS} \times 8043.75$ | $N_{CB} \times N_{SS} \times 6435.00$ |
| 20 | π/2-64QAM | 6 | 1 | 7/8 | $N_{CB} \times N_{SS} \times 8035.00$ | $N_{CB} \times N_{SS} \times 8662.50$ | $N_{CB} \times N_{SS} \times 6930.00$ |

TABLE 3

| EDMG-MCS index | Modulation | $N_{CBPS}$ | Code Rate |
|---|---|---|---|
| 1 | SQPSK | 1 | 1/2 |
| 2 | SQPSK | 1 | 5/8 |
| 3 | SQPSK | 1 | 3/4 |
| 4 | SQPSK | 1 | 13/16 |
| 5 | SQPSK | 1 | 7/8 |
| 6 | QPSK | 2 | 1/2 |
| 7 | QPSK | 2 | 5/8 |
| 8 | QPSK | 2 | 3/4 |
| 9 | QPSK | 2 | 13/16 |
| 10 | QPSK | 2 | 7/8 |
| 11 | 16QAM | 4 | 1/2 |
| 12 | 16QAM | 4 | 5/8 |
| 13 | 16QAM | 4 | 3/4 |
| 14 | 16QAM | 4 | 13/16 |
| 15 | 16QAM | 4 | 7/8 |
| 16 | 64QAM | 6 | 5/8 |
| 17 | 64QAM | 6 | 3/4 |
| 18 | 64QAM | 6 | 13/16 |
| 19 | 64QAM | 6 | 7/8 |

In the MCS configuration for the SC mode, three GIs (Guard Intervals) are defined for each MCS index. Here, $N_{CB}$ denotes the number of aggregated channels which has a value of 1 to 4, $N_{SS}$ denotes the total number of spatial streams, and $N_{CBPS}$ denotes the number of bits coded per symbol.

Additionally, a different MCS modulation method from the MCSs indicated by the above tables may be applied depending on the value of the 'NUC (Non-Uniform Constellation) Applied' field of the EDMG Header-A field. In an example, if the 'NUC Applied' field value of the EDMG Header-A field is '1' and the indicated MCS is 16QAM, the MCS for this configuration may be set to 8 PSK instead of 16QAM. By thus applying 8 PSK which has higher performance than 16QAM, throughput can be supplemented (or overcome) by the code rate.

This way, a total of 20 MCSs are applied to a 11ay system to which the present invention is applicable, and therefore STA may indicate a specific MCS by using a 5-bit indicator.

In this case, the 11ay system supports up to (maximum) eight spatial streams, so a total of 40 bits of information is needed to designate independent MCSs for different spatial streams. However, transmitting a total of 40 bits of information through the EDMG Header-A field may cause large signaling overhead.

In view of this, the present invention proposes a method for indicating MCSs applied to up to (maximum) eight spatial streams using less than 40 bits of information.

2.1. First Approach

First, there is proposed a first approach applicable to the present invention, in which a reference MCS (base MCS) is defined and information corresponding to the difference between an MCS actually applied to each spatial stream and the reference MCS is indicated.

Specifically, the reference MCS may be indicated by 5 bits of information. Next, MCS information for an X-th (1≤X≤8) spatial stream may be indicated by N bits of information. In this case, a total of (5+8*N) bits of information is needed to indicate MCSs applied to up to (maximum) eight spatial streams.

Here, the reference MCS may correspond to the lowest MCS index, the highest MCS index, the most frequent MCS index, or the median index between the lowest MCS index and the highest MCS index, among the MCSs applied to the plurality of spatial streams.

Various values may be used as the N value. In an example, if N=2 and the reference MCS corresponds to the lowest MCS index among the MCSs applied to the plurality of spatial streams, N bits of information for each spatial stream may indicate one of the following four MCS indices.

The same MCS index as the reference MCS
A higher MCS index than the reference MCS by M (M is a natural number)
A higher MCS index than the reference MCS by 2*M
A higher MCS index than the reference MCS by 3*M In a specific example, if N-bit information for a specific spatial stream is 0('00'), the N-bit information may indicate the same MCS index as the reference MCS. If the N-bit information is 1 ('01'), the N-bit information may indicate a higher MCS index than the reference MCS by M. If the N-bit information is 2 ('10'), the N-bit information may indicate a higher MCS index than the reference MCS by 2*M. If the N-bit information is 3 ('11'), the N-bit information may indicate a higher MCS index than the reference MCS by 3*M.

Alternatively, if the reference MCS corresponds to the highest MCS index among the MCSs for up to (maximum) eight spatial streams, the N-bit information for each spatial stream may be defined as opposed to the above.

Alternatively, if the reference MCS corresponds to the most frequent MCS index among the MCSs for up to (maximum) eight spatial streams or the median value of the corresponding MCS indices, the N-bit information for each spatial stream may be analyzed as follows.

Specifically, if N-bit information for a specific spatial stream is 0 ('00'), the N-bit information may indicate the same MCS index as the reference MCS. If the N-bit information is 1 ('01'), the N-bit information may indicate a lower MCS index than the reference MCS by M. If the N-bit information is 2 ('10'), the N-bit information may indicate a higher MCS index than the reference MCS by M. If the N-bit information is 3 ('11'), the N-bit information may indicate a higher MCS index than the reference MCS by 2*M.

It should be noted that, according to the above indication method, up to $2^N$ LDPC (Low Density Parity Check) encoders/decoders are needed. In view of this, the present invention proposes a method for indicating an MCS index having the same code rate as a reference MS and the same or a different modulation order by using the N-bit information.

In other words, if the reference MCS is an MCS having the lowest MCS index among the MCSs applied to a plurality of spatial streams which corresponds π/2 BPSK (Binary Phase-Shift Keying) and has a 1/2 code rate, the N-bit information having the value of 0 ('00') may indicate an MCS having the same modulation order and code rate as the reference MCS, and the N-bit information having the value of 1 ('01') may indicate an MCS corresponding to π/2 QPSK (Quadrature Phase-Shift Keying) which has the same 1/2 code rate as the reference MCS and a higher modulation order than the reference MCS by 1. Also, the N-bit information having the value of 2 ('10') may indicate an MCS corresponding to 16 QAM (Quadrature Amplitude Modulation) which has the same 1/2 code rate as the reference MCS and a higher modulation order than the reference MCS by 2, and the N-bit information having the value of 3 ('11') may indicate an MCS corresponding to 64 QAM which has the same 1/2 code rate as the reference MCS and a higher modulation order than the reference MCS by 3.

Additionally, when a signal or frame is transmitted by channel aggregation, MCSs for each aggregated channel need to be indicated to receive the signal or frame with high reliability.

In view of this, when the aforementioned method is applied to channel aggregation, the transmitted EDMG Header-A field may require a total of 2*(5+8*N) bits to indicate MCSs for each aggregated channel.

Alternatively, for channel aggregation transmission, MCSs for each aggregated channel may be indicated through (5+8*N) bit information of the EDMG Header-A field, as is the case for other types of transmission than channel aggregation transmission, in order reduce signaling overhead. In this case, some bits of the (5+8*N) bit information may be used to indicate MCS information for aggregated channels not including a primary channel.

In an example, 5 bits out of the (5+8*N) bit information contained in the EDMG Header-A field are used to indicate the reference MCS, and 4 N bits out of 8 N bit information may be used to indicate MCSs for spatial streams in aggregated channels including a primary channel, and the remaining 4 N bits may be used to indicate MCSs for spatial streams in aggregated channels not including a primary channel.

In another example, if the number of spatial streams for each aggregated channel out of a total of spatial streams is defined, the number of N bits corresponding to each aggregated channel out of 8 N bits may be defined. In a specific example, if the number of spatial streams in aggregated channels including a primary channel is 3 and the number of spatial streams in aggregated channels not including a primary channel is 5, 3 N bits out of the 8 N bit information may be used to indicate MCSs for the spatial streams in aggregated channels including a primary channel, and the remaining 5 bits may be used to indicate MCSs for the spatial streams in aggregated channels not including a primary channel.

In another example, a reference MCS for each aggregated channel may be set. That is, 5 bits out of 10-bit information may indicate reference MCSs for aggregated channels including a primary channel, and the remaining 5 bits may indicate reference MCSs for aggregated channels not including a primary channel. Subsequently, 8 N bit information may be divided into the number of spatial streams in each aggregated channel and used to indicate corresponding MCSs for spatial streams in each aggregated channel. In this case, bit information for indicating MCSs may be defined to be a total of 10+8*N bits.

2.2. Second Approach

Next, there is proposed a second approach applicable to the present invention, in which independent MCSs are indicated for four spatial streams out of up to (maximum) eight spatial streams and differential MCSs are indicated for the remaining spatial stream(s).

In an example, independent MCSs may be indicated (or set) for four spatial streams by using 20 (i.e., 4*5) bit information. In this case, each 5-bit information may indicate one of all the MCS indices in Table 2 without any restrictions. Alternatively, for convenience of implementation, each 5-bit information may indicate one of the MCS indices having the same code rate.

Subsequently, MCS information for up to 4 remaining spatial stream(s) may be indicated as differential values for independent indications (or independent MCSs) for four spatial streams, as explained previously. In this case, MCS information for every case (including when the same MCS index is indicated) may be indicated by using a minimum of m-bit information that satisfies $2^m \geq D+1$ if the number of differential steps is D. In this case, a total of 20+(5*m) bit information may be needed to indicate MCS information for up to (maximum) eight spatial streams.

Here, the differential size of one differential step may be set to p. Accordingly, when one step is indicated by a differential value, an MCS applied to the corresponding spatial stream may be an index that has a difference of ±p with a reference MCS index. Alternatively, p may denote the differential value of a modulation order, instead of the differential value of an MCS index.

For the aforementioned differential indication, a reference MCS needs to be set. Hereinafter, a concrete MCS indication method according to the second approach proposed in the present invention will be described in detail. For convenience of explanation, a configuration applicable to the present invention when the number (D) of differential steps is 3 and the bit length (M) indicating the differential value for each spatial stream is 2 will be described.

2.2.1 (2-1)th Approach

In the (2-1)th approach according to the present invention, the MCS index for the first spatial stream may be set as a reference MCS.

In a concrete example, the MCSs for the first to fourth spatial streams may be indicated by their individual bit information, and the MCS indices for the remaining fifth to eighth spatial streams may be indicated by bit information that indicates the differential value with the MCS index for the first spatial stream.

In this case, if the differential value for a specific spatial stream (e.g., one of the fifth to eighth spatial streams) is indicated as '00', this may mean that the MCS for the specific spatial stream is the same as the MCS for the first spatial stream. Also, if the differential value for a specific spatial stream is indicated as '01', this may mean that the MCS for the specific spatial stream has a difference of +p with the MCS index for the first spatial stream. Also, if the differential value for a specific spatial stream is indicated as '10', this may mean that the MCS for the specific spatial stream has a difference of +2p with the MCS index for the first spatial stream. Also, if the differential value for a specific spatial stream is indicated as '11', the MCS for the specific spatial stream has a difference of −p with the MCS index for the first spatial stream.

2.2.2 (2-2)th Approach

In the (2-2)th approach according to the present invention, the MCS indices for the first to fourth spatial streams may be all set as reference MCSs.

In a concrete example, the MCSs for the first to fourth spatial streams may be indicated by their individual bit information, and the MCS indices for the remaining fifth to eighth spatial streams may be respectively indicated by bit information that indicates the differential values with the MCS indices for the first to fourth spatial streams.

Specifically, the MCS index for the fifth spatial stream may be indicated by first bit information that indicates the difference with the MCS index for the first spatial stream, and the MCS index for the sixth spatial stream may be indicated by second bit information that indicates the difference with the MCS index for the second spatial stream. Subsequently, the MCS index for the seventh spatial stream may be indicated by third bit information that indicates the difference with the MCS index for the third spatial stream, and the MCS index for the eighth spatial stream may be indicated by fourth bit information that indicates the difference with the MCS index for the fourth spatial stream.

2.2.3 (2-3)th Approach

In the (2-3)th approach according to the present invention, the lowest or highest MCS index among the MCS indices for the first to fourth spatial streams may be set as a reference MCS.

In a concrete example, the MCSs for the first to fourth spatial streams may be indicated by their individual bit information, and the lowest or highest MCS index among the MCS indices for the four spatial streams may be set as a reference MCS. Subsequently, the MCS indices for the fifth to eighth spatial streams may be indicated by the difference with the reference MCS index.

2.2.4 (2-4)th Approach

In the (2-4)th approach according to the present invention, it is possible to indicate by additional signaling which of the MCS indices for the first to fourth spatial streams is set as a reference MCS. In other words, additional 2-bit information may be used to indicate the MCS index for a certain spatial stream, among the MCS indices for the first to fourth spatial streams, that is set as a reference MCS index for the fifth to eighth spatial streams.

2.2.5 (2-5)th Approach

In the (2-5)th approach according to the present invention, reference MCS information may be indicated through additional bit information. That is, additional 5-bit information may be used to indicate a reference MCS index for the fifth to eighth spatial streams.

Additionally, for channel aggregation transmission, various MCS indication methods described above may be similarly applied. That is, independent MCS indices may be used to indicate MCSs for a primary channel, and differential MCS indices may be used to indicate MCSs for a secondary channel.

Alternatively, half of the independent MCS indices and half of the differential MCS indices may be used to indicate MCSs for a primary channel, and the other half of the independent MCS indices and the other half of the differential MCS indices may be used to indicate MCSs for a secondary channel.

Figure 11:
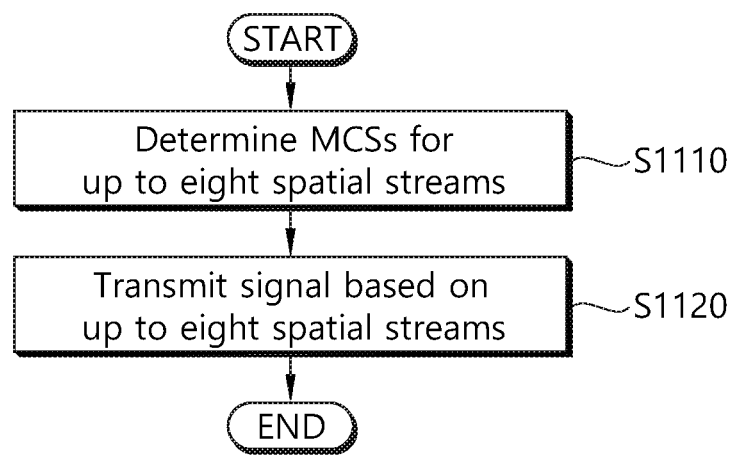
FIG. 11 is a flowchart showing a method for transmitting a signal by a station which is applicable to the present invention.

FIG. 11 is a flowchart showing a method for transmitting a signal by a station which is applicable to the present invention.

As illustrated in FIG. 11, a station according to the present invention may perform the steps S1110 and S1120 in order to transmit a signal based on/through a plurality of spatial streams.

First, the station determines Modulation and Coding Scheme (MCS) information for up to (maximum) eight spatial streams (S1110). The MCS information includes first information related to a reference MCS and second information related to modulation order differential information for the plurality of spatial streams. Here, the number of applicable spatial streams may be from 1 to 8, preferably, from 5 to 8.

The station may set an MCS having the lowest MCS index among the plurality of MCSs for the plurality of spatial streams (up to eight spatial streams) as the reference MCS.

Hereinafter, for convenience of explanation, it is assumed that an MCS having a modulation order of π/2 QPSK and a 3/4 code rate which corresponds to the MCS index '4' in Table 2 is set as the reference MCS.

Subsequently, the station determines the plurality of MCSs for up to (maximum) eight spatial streams. And the station determines modulation order differential information based on the reference MCS. That is, the plurality of MCSs for the plurality of spatial streams are determined based on the first information and the second information In an example, if an MCS having a modulation order of π/2 QPSK and a 3/4 code rate which corresponds to the MCS index '4' in Table 2 is set as the reference MCS, the modulation order differential information for each spatial stream may indicate the following information according to its value.

0: The same MCS as the reference MCS. That is, an MCS corresponding to the MCS index '4' in the above example.

1: An MCS having the same code rate as the reference MCS and a higher modulation order than the reference MCS by 1. That is, an MCS having a modulation order of π/2 QPSK and a 3/4 code rate which corresponds to MCS '9' in the above example.

2: An MCS having the same code rate as the reference MCS and a higher modulation order than the reference MCS by 2. That is, an MCS having a modulation order of π/2 16QAM and a 3/4 code rate which corresponds to MCS '14' in the above example.

3: An MCS having the same code rate as the reference MCS and a higher modulation order than the reference MCS by 3. That is, an MCS having a modulation order of π/2 64QAM and a 3/4 code rate which corresponds to MCS '18' in the above example.

The station transmits a signal containing MCS information for up to (maximum) eight spatial streams to a second STA based on/through the plurality of spatial streams (the up to eight spatial streams) (S1120). In this case, the MCS information for the plurality of spatial streams (up to eight spatial streams) may be transmitted based on/through the EDMG Header-A field in the signal.

In an example, first information related to the reference MCS may be included in 5-bit information, and the second information related to modulation order differential information may be included tin 2-bit information. As such, a total of 21 (=5+2*8) bits of information may be needed to indicate MCSs for the plurality of spatial streams (up to eight spatial streams).

This is advantageous in that, when independent MCSs for different spatial streams are indicated, MCS information for each spatial stream may be transmitted by information having a shorter bit length than a total of 40 (=8*5) bit information. In other words, signaling overhead for indicating MCS information for each spatial stream may be reduced according to the present invention.

To cope with this, a signal receiving station may receive a signal containing Modulation and Coding Scheme (MCS) information for the plurality of spatial streams (up to eight spatial streams), wherein the MCS information includes first information related to a reference MCS and the second information related to modulation order differential information, based on/through the up to eight spatial streams, and may decode the signal received based on/through the up to eight spatial streams by using the MCS information for up to eight spatial streams.

3. Device Configuration

Figure 12:
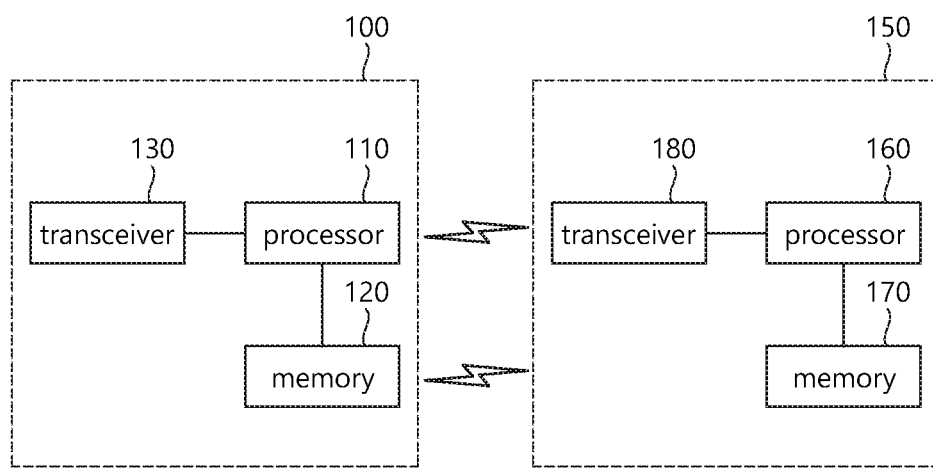
FIG. 12 is a diagram for explaining a device for implementing the aforementioned method

FIG. 12 is a diagram for explaining a device for implementing the aforementioned method.

A wireless device 100 shown in FIG. 12 may correspond to the aforementioned station transmitting a signal based on/through a plurality of spatial streams, and a wireless device 150 may correspond to the aforementioned station receiving a signal based on/through a plurality of spatial streams. In this case, each station may correspond to a 11ay terminal or PCP/AP. In what follows, for convenience of explanation, the signal transmitting station is referred to as a transmitting device 100, and the signal receiving station is referred to as a receiving device 150.

The transmitting device 100 may include a processor 110, a memory 120, and a transceiver 130, and the receiving device 150 may include a processor 160, a memory 170, and a transceiver 180. The transceiver 130/180 transmits/receives a radio signal and can be implemented in a physical layer such as IEEE 802.11/3GPP. The processor 110/160 is executed in a physical layer and/or MAC layer and is connected to the transceiver 130/180.

The processors 110 and 160 and/or the transceivers 130 and 180 may include application-specific integrated circuits (ASICs), other chipsets, logic circuits, and/or data processors. The memories 120 and 170 may include a read-only memory (ROM), a random access memory (RAM), a flash memory, a memory card, a storage medium, and/or other storage units. When an embodiment is executed by software, the method described above may be executed as a module (e.g., a process, a function) that performs the functions described above. The module may be stored in the memories 120 and 170 and executed by the processors 110 and 160. The memories 120 and 170 may be located inside or outside the processors 110 and 160, and may be connected to the processors 110 and 160 by a well-known means.

The detailed description of preferred embodiments of the invention set forth above is provided to enable those skilled in the art to implement and practice the invention. Although the present invention has been fully described by way of example with reference to the accompanying drawings, it is to be understood that various modifications and changes may be made in the invention without departing from the scope and spirit of the invention. Accordingly, the present invention is not intended to be limited to the embodiments disclosed herein but is to be accorded the widest scope consistent with the principles and novel features disclosed herein.

The present invention has been explained under the assumption that the present invention is applied to IEEE 802.11 based wireless LAN system, by which the present invention may be non-limited. The present invention can be applied to various wireless systems capable of transmitting data based on channel bonding using the same scheme.

What is claimed is:

1. A method used in a wireless LAN (WLAN) system, the method comprising:
    configuring, by a first station (STA), a header field for a plurality of spatial streams (SSs),
    wherein a maximum number of the plurality of SSs is eight,
    wherein the header field includes a single subfield related to a reference Modulation and Coding Scheme (MCS) and a plurality of differential subfields related to modulation order differential information for the plurality of SSs,
    wherein the single subfield in the header field has a length of 5 bits and each differential subfield has a length of 2 bits,
    wherein the plurality of SSs have a same code rate defined by the reference MCS, and
    wherein a plurality of MCSs for the plurality of SSs are determined based on the single subfield and the plurality of differential subfields; and
    transmitting, by the first STA, a physical protocol data unit (PPDU) including the header field to a second STA based on the plurality of SSs.

2. The method of claim 1, wherein the reference MCS is an MCS having a lowest MCS index among the plurality of MCSs for the plurality of SSs.

3. The method of claim 1, wherein the header field is an Enhanced Directional Multi-Gigabit (EDMG) Header-A field in the PPDU.

4. The method of claim 1, wherein an MCS for each of the plurality of SSs is one of the following:
    a first MCS having a same MCS as the reference MCS,
    a second MCS having a higher modulation order than the reference MCS by 1,
    a third MCS having a higher modulation order than the reference MCS by 2, and
    a fourth MCS having a higher modulation order than the reference MCS by 3.

5. The method of claim 4,
    wherein a first one of the plurality of differential subfields has a value of 0 for the first MCS,
    wherein a second one of the plurality of differential subfields has a value of 1 for the second MCS,
    wherein a third one of the plurality of differential subfields has a value of 2 for the third MCS, and
    wherein a fourth one of the plurality of differential subfields has a value of 3 for the fourth MCS.

6. A method in a wireless LAN (WLAN) system, the method comprising:
    receiving, by a first station (STA), a physical protocol data unit (PPDU) including a header field from a second STA based on a plurality of spatial streams (SSs),
    wherein a maximum number of the plurality of SSs is eight,
    wherein the header field includes a single subfield related to a reference Modulation and Coding Scheme (MCS) and a plurality of differential subfields related to modulation order differential information for the plurality of SSs,
    wherein the single subfield in the header field has a length of 5 bits and each differential subfield has a length of 2 bits,
    wherein the plurality of SSs have a same code rate defined by the reference MCS, and
    wherein a plurality of MCSs for the plurality of SSs are determined based on the single subfield and the plurality of differential subfields; and
    decoding the PPDU based on the plurality of MCSs.

7. The method of claim 6, wherein the reference MCS is an MCS having a lowest MCS index among the plurality of MCSs for the plurality of SSs.

8. The method of claim 6, wherein the header field is an Enhanced Directional Multi-Gigabit (EDMG) Header-A field in the PPDU.

9. The method of claim 6, wherein an MCS for each of the plurality of SSs is one of the following:
- a first MCS having a same MCS as the reference MCS,
- a second MCS having a higher modulation order than the reference MCS by 1,
- a third MCS having a higher modulation order than the reference MCS by 2, and
- a fourth MCS having a higher modulation order than the reference MCS by 3.

10. The method of claim 9,
- wherein a first one of the plurality of differential subfields has a value of 0 for the first MCS,
- wherein a second one of the plurality of differential subfields has a value of 1 for the second MCS,
- wherein a third one of the plurality of differential subfields has a value of 2 for the third MCS, and
- wherein a fourth one of the plurality of differential subfields has a value of 3 for the fourth MCS.

11. A first station in a wireless LAN (WLAN) system, comprising:
- a transceiver having one or more radio frequency (RF) chains and configured to transmit or receive a signal; and
- a processor connected to the transceiver, wherein the processor is configured to:
  - configure a header field for a plurality of spatial streams (SSs),
  - wherein a maximum number of the plurality of SSs is eight,
  - wherein the header field includes a single subfield related to a reference Modulation and Coding Scheme (MCS) and a plurality of differential subfields related to modulation order differential information for the plurality of SSs,
  - wherein the single subfield in the header field has a length of 5 bits and each differential subfield has a length of 2 bits,
  - wherein the plurality of SSs have a same code rate defined by the reference MCS, and
  - wherein a plurality of MCSs for the plurality of SSs are determined based on the singled field and the plurality of differential subfields, and
  - transmit a physical protocol data unit (PPDU) including the header field to a second station based on the plurality of SSs.

* * * * *